(12) United States Patent
Uemura et al.

(10) Patent No.: US 9,658,980 B2
(45) Date of Patent: *May 23, 2017

(54) IN-VEHICLE SENSOR AND IN-VEHICLE SENSOR SYSTEM

(71) Applicant: NGK SPARK PLUG CO., LTD., Nagoya-shi, Aichi (JP)

(72) Inventors: Tomonori Uemura, Komaki (JP); Kaoru Hisada, Obu (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 438 days.

This patent is subject to a terminal disclaimer.

(21) Appl. No.: 14/278,173

(22) Filed: May 15, 2014

(65) Prior Publication Data
US 2014/0344499 A1 Nov. 20, 2014

(30) Foreign Application Priority Data
May 17, 2013 (JP) ................. 2013-105401

(51) Int. Cl.
*H04L 12/40* (2006.01)
*G06F 13/40* (2006.01)

(52) U.S. Cl.
CPC .... *G06F 13/4086* (2013.01); *H04L 12/40006* (2013.01); *H04L 2012/40215* (2013.01); *H04L 2012/40273* (2013.01)

(58) Field of Classification Search
CPC . H04L 2012/40273; H04L 2012/40267; H04L 12/40006
See application file for complete search history.

(56) References Cited

U.S. PATENT DOCUMENTS 6,684,152 B2 * 1/2004 Baeuerle ............... B60T 17/221
  701/114
7,523,239 B2 * 4/2009 Shimizu ............ H04L 12/40169
  710/110

(Continued)

FOREIGN PATENT DOCUMENTS

JP    2005-003640 A    1/2005
JP    2005-286471 A    10/2005
(Continued)

OTHER PUBLICATIONS

Office Action in corresponding JP Application No. 2013-105401 dispatched Feb. 28, 2017, 7 pages total.

*Primary Examiner* — Brian Misiura
(74) *Attorney, Agent, or Firm* — Sughrue Mion, PLLC

(57) ABSTRACT

An in-vehicle sensor (1) mounted on a vehicle VE and connected to a communication bus CAN including a bus connection connector (40) for connection to the CAN and external terminals (T3, T4) for communication, and one or a plurality of external terminals (T5, T6) for setting each brought into either of a first connection state not connected to any potential and a second connection state connected to a ground potential GND; a judgment section S1-S4, S5-S7 for setting whether the connection state is the first connection state or the second connection state; and an identifier setting section S8 which sets an identifier ID of the in-vehicle sensor (1) used on the communication bus CAN based on the judged connection state(s) for setting of the one or plurality of external terminals (T5, T6).

6 Claims, 9 Drawing Sheets

(56) References Cited

U.S. PATENT DOCUMENTS

| | | | | |
|---|---|---|---|---|
| 7,668,991 | B2* | 2/2010 | Kopplin | H04L 12/403 710/104 |
| 8,332,104 | B2* | 12/2012 | Greer | G06F 11/30 180/167 |
| 8,532,869 | B2* | 9/2013 | Kimoto | G01K 15/00 701/29.2 |
| 8,961,761 | B2* | 2/2015 | Maeda | F01N 11/007 204/406 |
| 8,996,256 | B2* | 3/2015 | Inamoto | B60R 21/0173 370/245 |
| 9,082,242 | B2* | 7/2015 | Cicala | G01R 31/007 |
| 9,371,051 | B2* | 6/2016 | Shimizu | B60R 21/0136 |
| 2005/0154474 | A1* | 7/2005 | Kauntz | B60R 16/0315 700/1 |
| 2015/0046133 | A1* | 2/2015 | Morita | G06F 17/5009 703/2 |
| 2015/0149682 | A1* | 5/2015 | Uemura | G06F 13/28 710/308 |
| 2015/0308998 | A1* | 10/2015 | Suzuki | B60L 11/1881 73/31.05 |

FOREIGN PATENT DOCUMENTS

| | | |
|---|---|---|
| JP | 2007-024566 A | 2/2007 |
| JP | 2007-309905 A | 11/2007 |

* cited by examiner

IN-VEHICLE SENSOR AND IN-VEHICLE SENSOR SYSTEM

TECHNICAL FIELD

The present invention relates to an in-vehicle sensor which is to be mounted on a vehicle and to be connected to a communication bus constructed in the vehicle, and to an in-vehicle sensor system in which a plurality of in-vehicle sensors are connected to such a communication bus.

BACKGROUND ART

Various sensors such as gas sensors (e.g., an oxygen sensor and an NOx sensor), a temperature sensor, and a knock sensor are mounted on a vehicle. Such in-vehicle sensors are connected to a communication bus constructed in the vehicle, and are controlled, in a centralized manner, by an ECU (electronic control unit) connected to the communication bus. Therefore, each in-vehicle sensor has an identifier which is assigned thereto and is used for identifying the sensor on the communication bus. The ECU exchanges communication data with each in-vehicle sensor through the communication bus by designating the identifier.

Notably, examples of standards for such a communication bus include CAN (Controller Area Network) and LIN (Local Interconnect Network).

PRIOR ART DOCUMENTS

Patent Documents

[Patent Document 1] Japanese Patent Application Laid-Open (kokai) No. 2007-24566
[Patent Document 2] Japanese Patent Application Laid-Open (kokai) No. 2007-309905

SUMMARY OF THE INVENTION

Problem to be Solved by the Invention

Therefore, each in-vehicle sensor must be installed at a predetermined location on a vehicle, with an identifier used on the communication bus being assigned thereto in advance. In some cases, a plurality of in-vehicle sensors of the same type are used in a single vehicle. For example, as shown in FIG. 6 of Patent Document 1, in a fuel cell vehicle, a plurality of hydrogen sensors of the same type are mounted as in-vehicle sensors. Notably, the details of such a hydrogen sensor is disclosed in Patent Document 2, which shows a hydrogen sensor (hydrogen gas leakage detector) disposed in piping of a fuel cell unit of an automobile. Therefore, it is necessary to prepare in-vehicle sensors which are of the same type but have different identifiers corresponding to their installation locations. Also, when a plurality of in-vehicle sensors are installed in a vehicle, due to confusion in using the in-vehicle sensors, the in-vehicle sensors may be erroneously installed; i.e., a sensor whose identifier differs from the correct one may be connected. Much labor has been required to manage the in-vehicle sensors so as to prevent such erroneous installation.

The present invention has been accomplished in view of such a problem, and its object is to provide an in-vehicle sensor to which an identifier does not need to be assigned in advance, and an in-vehicle sensor system in which a plurality of such in-vehicle sensors are connected to a communication bus.

Means for Solving the Problem

Its one mode is an in-vehicle sensor which is to be mounted on a vehicle and is to be connected to a communication bus constructed in the vehicle, comprising a bus connection connector used for connection to the communication bus and including one or a plurality of communication external terminals to be connected to a communication line of the communication bus through which communication data flow, and one or a plurality of external terminals for setting each brought into a connection state which is either of a first connection state in which it is not connected to any potential outside the in-vehicle sensor and a second connection state in which it is connected to a ground potential outside the in-vehicle sensor; a judgment section which judges for the one or plurality of external terminals for setting whether the connection state is the first connection state or the second connection state; and an identifier setting section which sets an identifier of the in-vehicle sensor used on the communication bus on the basis of the judged connection state(s) of the one or plurality of external terminals for setting.

In this in-vehicle sensor, one or a plurality of external terminals for setting are provided in the bus connection connector. Each external terminal for setting is brought into either of the first connection state (open state) in which it is not connected to any potential outside the in-vehicle sensor and the second connection state (grounded state) in which it is connected to the ground potential outside the in-vehicle sensor.

In in-vehicle sensor, the judgment section judges, for each external terminal for setting, whether its connection state is the first connection state (open state) or the second connection state (grounded state), and the identifier used on the communication bus is set on the basis of the judged connection state(s) of the one or plurality of external terminals for setting.

Therefore, it is unnecessary to assign an identifier to the in-vehicle sensor in advance. When the in-vehicle sensor is connected to the communication bus through use of the bus connection connector and is installed in the vehicle, at the installed location, the external terminal(s) for setting of the bus connection connector is brought into connection state(s) corresponding to the installed location, whereby an identifier is set for the in-vehicle sensor. Therefore, a plurality of in-vehicle sensors of the same type can be used.

Notably, the identifier used on the communication bus is an 11-bit code in the case where the communication bus is CAN. Also, the identifier is a 6-bit code in the case where the communication bus is LIN. Meanwhile, two states; i.e., the first connection state (open state) and the second connection state (grounded state) can be set for one external terminal for setting. Therefore, in the case where n external terminals for setting are provided, $2^n$ identifiers can be set. Accordingly, for example, in the case where two external terminals for setting are provided, $2^2=4$ identifiers can be set.

In addition, in this in-vehicle sensor, each external terminal for setting is brought into an open state (the first connection state) or is connected to the ground potential (the second connection state), and is not connected a power supply potential supplied externally (a battery mounted on the vehicle) or other potentials generated from the power supply potential, etc. outside the in-vehicle sensor. Therefore, the external terminal(s) for setting is unlikely to receive noise generated as a result of superimposition of surge voltage on the externally supplied power supply potential or other potentials. Thus, an erroneous judgment is unlikely to be made due to noise, and it is possible to properly judge the connection state of the external terminal(s) for setting and correctly set the identifier.

Furthermore, the above-described in-vehicle sensor preferably comprises a microprocessor having an input signal port to which an input signal is input, wherein the judgment section comprises a level generation circuit which is connected to the external terminal for setting and the input signal port and generates the input signal whose voltage level depends on the connection state of the external terminal for setting; and a level judgment section which judges, on the basis of the voltage level of the input signal input to the input signal port, whether the connection state of the external terminal for setting is the first connection state or the second connection state.

In this in-vehicle sensor, the input signal whose voltage level depends on the connection state (the first connection state or the second connection state) of the external terminal for setting is generated by the level generation circuit of the judgment section, and is input to the input signal port of the microprocessor. Also, of the judgment section, the level judgment section in the microprocessor judges whether the connection state of the external terminal for setting is the first connection state or the second connection state on the basis of the voltage level of the input signal input to the input signal port.

By virtue of this, the connection state of the external terminal for setting can be easily judged on the basis of the voltage level of the input signal input to the input signal port of the microprocessor.

Notably, the input signal port may be a digital input signal port (I/O input port) or an analog input signal port (A/D input port). For example, in the case where a digital input signal port (I/O input port) is used, the voltage level of the input signal generated by the level generation circuit is changed between two different voltage levels which can be recognized as a high level and a low level, respectively, in accordance with the connection state of the external terminal for setting. Also, such an input signal may be input to an analog input signal port (A/D input port). Meanwhile, in the case where an A/D input port is used, the voltage level of the input signal generated by the level generation circuit is changed between two different voltage levels which can be distinguished from each other within a range within which A/D input is possible.

The above-described in-vehicle sensor preferably comprises a potential generation section which generates a constant potential for judgment, wherein the level generation circuit connects the external terminal for setting to the potential for judgment through a resistor, and generates the input signal through use of the potential of the external terminal for setting.

In this in-vehicle sensor, the level generation circuit connects the external terminal for setting to a constant potential for judgment through a resistor. Therefore, the potential of the external terminal for setting does not become unstable even when the connection state of the external terminal for setting is the first connection state (open state), and the potential of the external terminal for setting is determined in accordance with the connection state thereof (the first connection state or the second connection state). By virtue of this, the level generation circuit can generate a proper input signal by using the determined potential of the external terminal for setting. Therefore, the connection state can be properly judged through use of the input signal.

Notably, the potential for judgment may be a potential generated by a circuit dedicated for potential for judgment used in the level generation circuit, or a power supply potential for control used as a power supply of the microprocessor. In this case, a stabilized power supply circuit which generates the power supply potential for control from a battery potential serves as the potential generation section.

Also, the potential for judgment may be an output potential of a surge protection circuit which absorbs surge voltage superimposed on the battery potential. In this case, the surge protection circuit serves as the potential generation section. Notably, in the case where a potential, such as the output potential, which is higher than the power supply potential for control is used as the potential for judgment, it is preferred that the voltage level of the input signal generated by the level generation circuit is converted through use of a transistor, a level conversion IC, or the like such that the input signal can be input to the input signal port of the microprocessor.

Also, it is possible to cause the microprocessor to output a high level or a predetermined potential from a digital or analog output signal port (I/O output port, D/A output port) thereof, and to use this output signal as the potential for judgment. In this case, the output signal port serves as the potential generation section.

Further, the above-described in-vehicle sensor preferably comprises a microprocessor having an input signal port to which an input signal is input and an output signal port from which an output signal is output, wherein the judgment section comprises an input generation circuit which is connected to the external terminal for setting, the input signal port, and the output signal port and which generates, as the input signal, a first input signal when the connection state of the external terminal for setting is the first connection state or a second input signal when the connection state of the external terminal for setting is the second connection state, at least one of the first and second input signals changing in response to a change in the output signal, and the first and second input signals being different from each other; an output changing section which changes the output signal output from the output signal port; and a response judgment section which judges whether the connection state of the external terminal for setting is the first connection state or the second connection state through use of a response of the input signal input to the input signal port to the change of the output signal.

In this in-vehicle sensor, the input generation circuit of the judgment section generates, as the input signal, different input signals (a first input signal and a second input signal) which differ from each other in terms of the response to the change of the output signal, depending on whether the connection state of the external terminal for setting is the first connection state or the second connection state, and the generated input signals are input to the input signal portion of the microprocessor. Of the judgment section, the output changing section in the microprocessor changes the output signal output from the output signal port, and the response judgment section in the microprocessor judges whether the connection state of the external terminal for setting is the first connection state or the second connection state through use of a response of the input signal (input to the input signal port) to the change of the output signal.

By virtue of this, it is possible to properly judge the connection state of the external terminal for setting on the basis of the response of the input signal (input to the input signal port) to the change of the output signal output from the output signal port of the microprocessor.

Notably, the output signal port may be a digital output signal port (I/O output port) or an analog output signal port (D/A output port). For example, in the case where a digital output signal port (I/O output port) is used, the output changing section changes the output signal between a high level and a low level. Also, in the case where an analog output signal port (D/A output port) is used, the output changing section can change the output signal to an arbitrary potential within a range within which D/A output is possible. Also, the input signal port may be a digital input signal port (I/O input port) or an analog input signal port (A/D input port) as in the above-described case.

Notably, the combination of the output signal and the connection state of the external terminal for setting and the input signal corresponding thereto may have the following relation, for example. When the output signal is changed with time, in one connection state, the input signal changes in synchronism with the output signal, and, in the other connection state, the input signal does not change irrespective of the output signal. Also, the relation may be such that the time constant of the response of the input signal to the output signal changes depending on the connection state.

Furthermore, any of the above-described in-vehicle sensors is preferably configured such that the input generation circuit is a circuit which connects the input signal port to the external terminal for setting and connects the input signal port to the output signal port through a resistor.

In this in-vehicle sensor, the above-described circuit is used as the input generation circuit. Therefore, for example, in the case where a digital output signal port (I/O output port) is used as an output signal port, the input signal changes in the same manner as the output signal when the connection state of the external terminal for setting is the first connection state (open state). Namely, when the output signal is changed to the high level, the input signal also becomes the high level, and, when the output signal is changed to the low level, the input signal also becomes the low level. Meanwhile, when the connection state is the second connection state (grounded state), the input signal becomes the low level irrespective of whether the level of the output signal is high or low. Namely, in the case where the input signal changes in synchronism with the change of the output signal between the high level and the low level, the connection state is the first connection state (open state). Meanwhile, in the case where the input signal does not change and is maintained at the low level even when the output signal changes, the connection state is the second connection state (grounded state).

In this in-vehicle sensor, the connection state of the external terminal for setting can be easily judged by an input generation circuit having a simple configuration.

Notably, an analog output signal port (D/A output port) may be used as the output signal port in place of the above-described digital output signal port (I/O output port). Also, as the input signal port into which the input signal is input, a digital input signal port (I/O input port) or an analog input signal port (A/D input port) may be used in accordance with the voltage level of the output signal.

Another mode is an in-vehicle sensor system comprising a plurality of in-vehicle sensors according to any one of claims 1 to 5 and the communication bus to which the in-vehicle sensors are connected, the in-vehicle sensor system including a plurality of connection paths which connect the in-vehicle sensors to the communication bus and each of which includes a sensor connection connector provided for each of the plurality of in-vehicle sensors and mated with the bus connection connector of the corresponding in-vehicle sensor, wherein each of the plurality of connection paths includes a connection path for communication for connecting the one or plurality of communication external terminals of the bus connection connector to the communication line of the communication bus, and one or a plurality of setting paths each of which prevents the external terminal for setting from being connected to any potential or connects the external terminal for setting to the ground potential to thereby set the connection state of the external terminal for setting to the first connection state or the second connection state, wherein the one or plurality of setting paths differ among the connection paths in terms of the connection states of the external terminals for setting set by the setting paths or a combination thereof, whereby the identifiers of all the in-vehicle sensors are made different from one another.

This in-vehicle sensor system includes connection paths including sensor connection connectors mated with the bus connection connectors of the in-vehicle sensors. The setting path of each connection path which sets the connection state of the external terminal for setting of the bus connection connector to either of the first connection state and the second connection state differs among the connection paths in terms of the connection states of the external terminals for setting set by the setting path or the combination thereof. By virtue of this, there can be obtain an in-vehicle sensor system in which prior assignment of identifiers is unnecessary, and a plurality of in-vehicle sensors of the same type can be used by setting the identifiers of the in-vehicle sensor such that they differ from one another.

MODES FOR CARRYING OUT THE INVENTION

Embodiment 1

Figure 1:
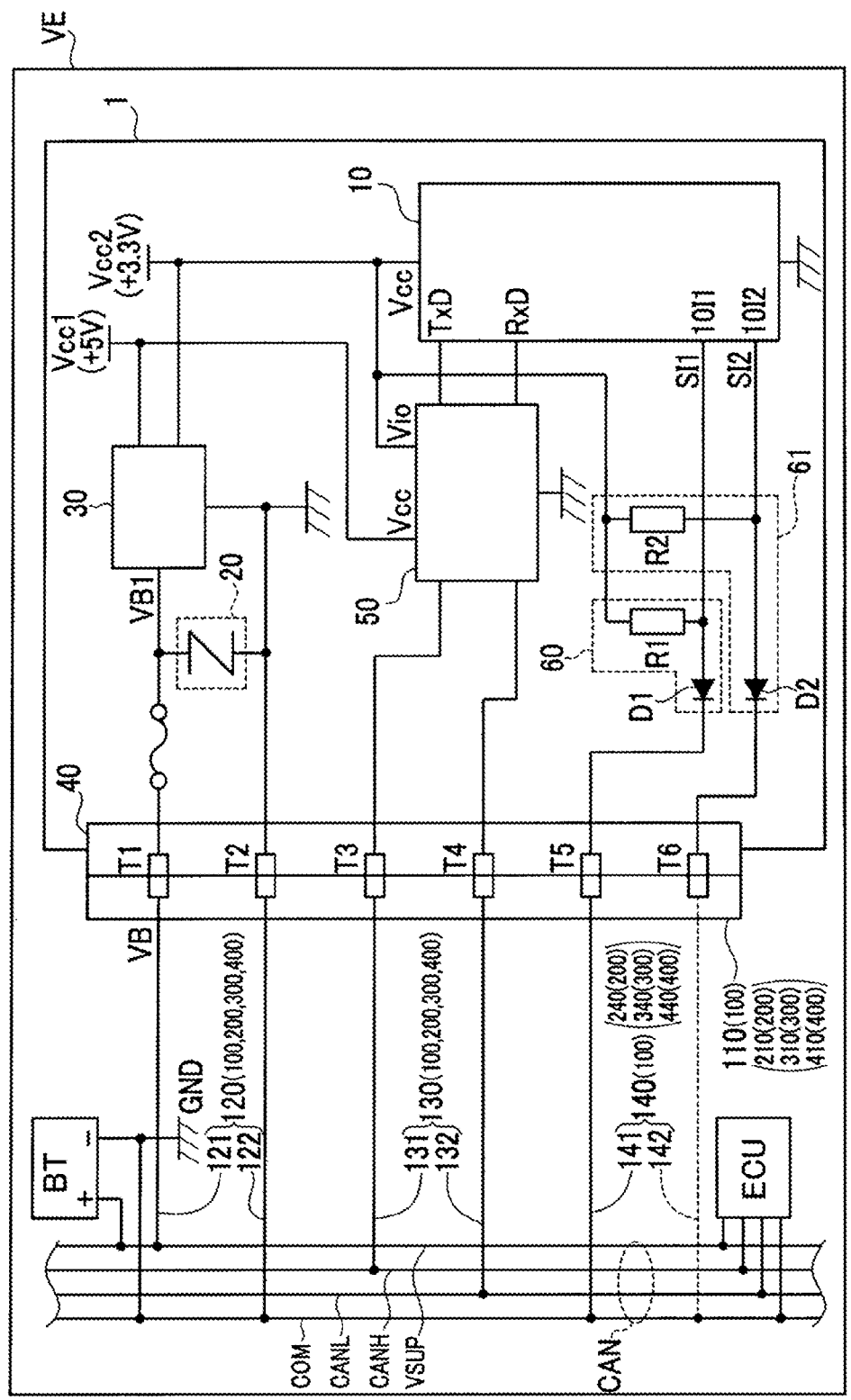
FIG. 1 Explanatory diagram schematically showing the configuration of an in-vehicle sensor according to Embodiment 1.
Figure 2:
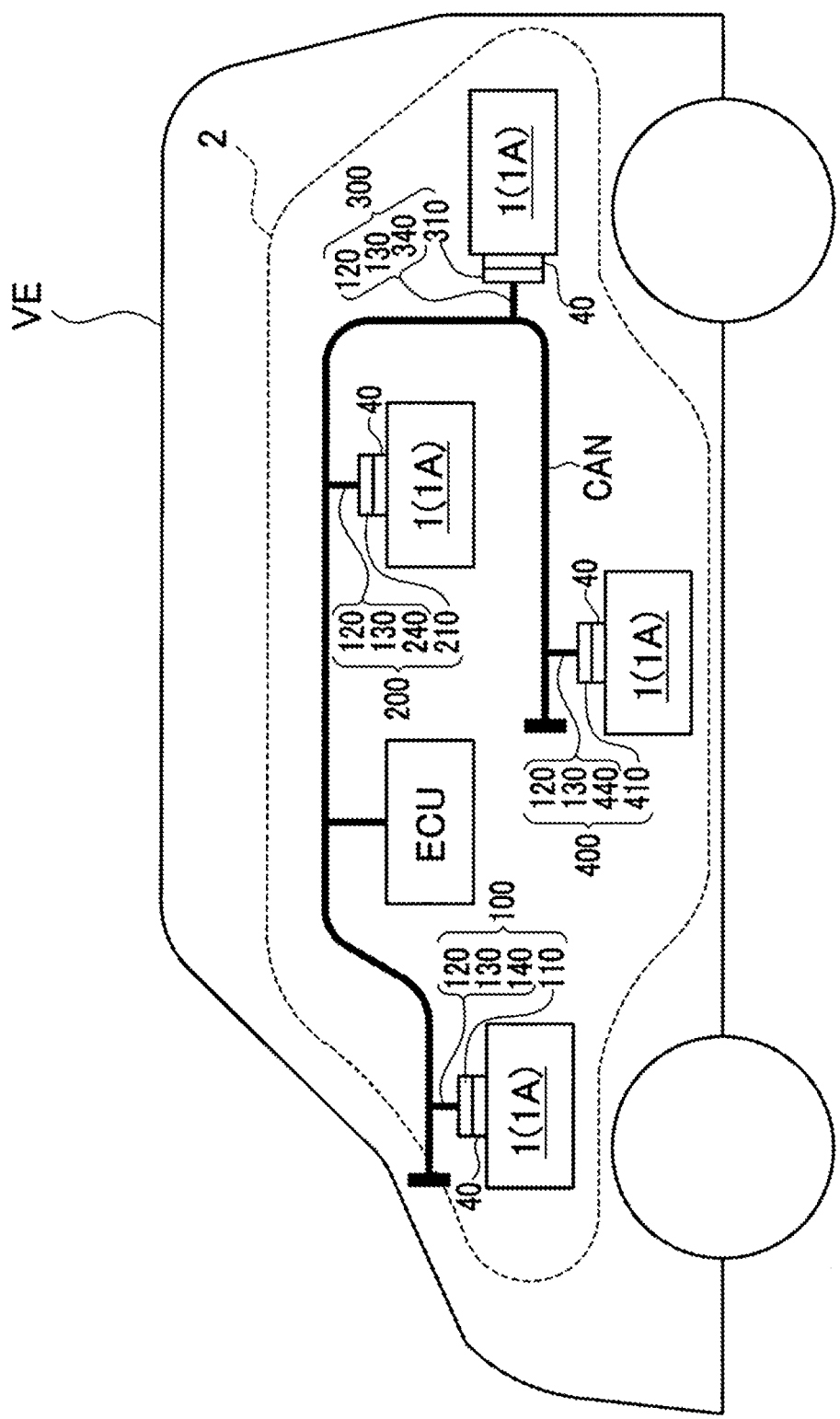
FIG. 2 Schematic diagram of an in-vehicle sensor system in which a plurality of in-vehicle sensors according to Embodiments 1 and 2 are connected to a communication bus.

A first embodiment of the present invention will now be described with reference to the drawings. FIG. 1 is a diagram schematically showing the configuration of an in-vehicle sensor 1 according to the present Embodiment 1 mounted on a vehicle VE. Also, FIG. 2 is a schematic diagram of an in-vehicle sensor system 2 in which a plurality of in-vehicle sensors 1 are connected to an ECU through a communication bus constructed in the vehicle VE. In this in-vehicle sensor system 2, a CAN bus is used as a communication bus. Notably, the in-vehicle sensor 1 is a hydrogen sensor which is the same as a hydrogen sensor disclosed in Patent Document 1 and to which the present invention is applied. However, in the present Embodiment 1, description on a sensor portion of the in-vehicle sensor 1 is omitted, and only a portion relating to the connection with the CAN bus which is a communication bus and a portion relating to communications with the ECU will be described.

As shown in FIG. 1, each of a plurality of (four in the present Embodiment 1) in-vehicle sensors 1, 1 mainly includes a microprocessor 10 having a CAN controller function, a CAN transceiver 50, a surge protection circuit 20, a stabilized power supply circuit 30, and a bus connection connector 40 having six terminals T1-T6. These in-vehicle sensors 1 are connected to the CAN bus by connection paths 100, 200, 300, 400 including sensor connection connectors 110, 210, 310, 410 mated with corresponding bus connection connectors 40 (see also FIG. 2).

The CAN bus includes not only two communication lines CANH, CANL through which communication data flow, but also a VSUP line connected to a power supply potential VB supplied from a + terminal of a battery BT (12 V) of the vehicle VE, and a COM line connected to a ground potential GND communicating with a − terminal of the battery BT. Notably, communication on the CAN bus is differential serial communication in which a signal is transmitted by a potential difference between the two communication lines CANH and CANL.

First, the connection paths 100, 200, 300, 400 will be described.

Each connection path 100-400 includes not only the sensor connection connector 110, 210, 310, 410, but also a power supply line 120 composed of lines 121, 122 through which the terminals T1, T2 of the bus connection connector 40 mated with the sensor connection connector 110-410 are connected to the VSUP line and the COM line of the CAN bus, respectively, and a communication connection path 130 composed of lines 131, 132 through which the terminals T3, T4 of the bus connection connector 40 are connected to the communication lines CANH, CANL.

Further, the connection path 100-400 includes a setting path 140 (lines 141, 142), 240, 340, 440 for determining the connection states of the terminals T5, T6 of the bus connection connector 40 outside the in-vehicle sensor 1.

Notably, in FIG. 1, the line 141 of the setting path 140 indicated by a continuous line is connected to the COM line of the CAN bus. Therefore, the terminal T5 of the bus connection connector 40 connected to the connection path 100 is connected to the ground potential GND outside the in-vehicle sensor 1 (a second connection state). Also, a line 142 indicated by a broken line is not present in actuality, and is not connected to the COM line. Therefore, the terminal T6 of the bus connection connector 40 connected to the connection path 100 is brought into an open state in which it is not connected to any potential outside the in-vehicle sensor 1 (a first connection state). Namely, the setting path 140 of the connection path 100 is set such that the terminal T5 is grounded to the ground potential GND and the terminal T6 becomes an open state.

The connection paths 200, 300, 400 have setting paths 240, 340, 440, respectively, in place of the setting path 140 of the connection path 100. Although not illustrated, the setting path 240 is set such that both the terminals T5, T6 are connected to the ground potential GND. The setting path 340 is set such that the terminal T5 is brought into an open state and the terminal T6 is connected to the ground potential GND. The setting path 440 is set such that each of the terminals T5, T6 is brought into an open state.

As described above, the setting paths 140, 240, 340, 440 differ from one another in terms of the combination of the connection states of the terminals T5, T6. Notably, the sensor connection connectors 110-410 of the connection paths 100-400 have the same specifications except the point that the different setting paths 140-440 are connected to the sensor connection connectors 110-410. Also, the remaining paths other than the setting paths 140-440 and the sensor connection connectors 110-410; i.e., the power supply line 120 and the communication connection path 130, are the same among all the connection paths 100-400.

Next, the internal configuration of the in-vehicle sensor 1 will be described.

As described above, the terminal T1 of the bus connection connector 40 is connected to the VSUP line of the CAN bus through the line 121 of the power supply line 120 of the connection path 100-400. Namely, the terminal T1 is a power supply terminal connected to the power supply potential VB. As described above, the terminal T2 is connected to the COM line of the CAN bus through the line 122 of the power supply line 120 of the connection path 100-400. Namely, the terminal T2 is a ground terminal connected to the ground potential GND.

The power supply potential VB supplied to the terminal T1 is connected to the surge protection circuit 20 which is formed by a varistor, etc. and which absorbs surge voltage superimposed on the power supply potential VB. From the output potential VB1 of the surge protection circuit 20, stabilized control power supply voltages Vcc1 (=+5 V), Vcc2 (=+3.3 V) used in the in-vehicle sensor 1 are generated by a stabilized power supply circuit 30. Notably, a Vcc terminal of the microprocessor 10 is connected to the control power supply voltage Vcc2 (=+3.3 V), and the microprocessor 10 is driven by the control power supply voltage Vcc2. The CAN transceiver 50 is driven by two power supplies; i.e., the control power supply voltage Vcc1 (=+5 V) supplied to a Vcc terminal thereof and the control power supply voltage Vcc2 (=+3.3 V) supplied to a Vio terminal thereof.

The terminals T3, T4 of the bus connection connector 40 are communication external terminals which are connected to the communication lines CANH, CANL of the CAN bus, externally of the in-vehicle sensor 1, through the communication connection path 130 (the lines 131, 132) of the connection path 100-400. Within the in-vehicle sensor 1, the terminals T3, T4 are connected to the CAN transceiver 50. The CAN transceiver 50 is connected to serial communication ports TxD, RxD of the microprocessor 10 which is a CAN controller. The in-vehicle sensor 1 exchanges communication data with the ECU through the communication connection path 130 connected to the terminals T3, T4 of the bus connection connector 40 and the communication lines CANH, CANL; i.e., the CAN bus. Notably, the ECU designates each piece of equipment connected to the CAN bus by its identifier (hereinafter referred to as the "distinguishing ID") and communicates therewith. Therefore, it is necessary to assign to each in-vehicle sensor 1 a distinguishing ID which does not duplicate with those of other in-vehicle sensor 1 on the CAN bus.

The terminals T5, T6 of the bus connection connector 40 are external terminal for settings each of which is brought into one of two connections states; i.e., a first connection state (open state) in which it is not connected to any potential outside the in-vehicle sensor 1 and a second connection state (grounded state) in which it is connected to the ground potential GND outside the in-vehicle sensor 1, by the setting path 140-440 of the connection path 100-400. Notably, as described above, in FIG. 1, the terminal T5 is connected to the ground potential GND (the second connection state) and the terminal T6 is brought into an open state (the first connection state) by the setting path 140 (the line 141 indicated by a continuous line and the un-existing line 142 indicated by a broken line) of the connection path 100.

These two terminals T5, T6 are connected to the cathodes of diodes D1, D2 for protection against surge noise or the like, and the anodes of these diodes D1, D2 are connected to the control power supply Vcc2 (=+3.3 V) through resistors R1, R2, respectively. Namely, the terminals T5, T6 are connected to the control power supply Vcc2 through the protection diodes D1, D2 and the resistors R1, R2, respectively. One end of the resistor R1 is connected the control power supply Vcc2, and the other end of the resistor R1 on the side toward the anode of the diode D1 is connected to an input port 10I1 which is a digital input signal port (I/O input port) of the microprocessor 10. Similarly, one end of the resistor R2 is connected the control power supply Vcc2, and the other end of the resistor R2 on the side toward the anode of the diode D2 is connected to an input port 10I2 which is another digital input signal port (I/O input port) of the microprocessor 10. Notably, in the present Embodiment 1, the potential (+3.3 V) of the control power supply voltage Vcc2 corresponds to the potential for judgment, and the stabilized power supply circuit 30 corresponds to the potential generation section. The diodes D1, D2 and the resistors R1, R2 form level generation circuits 60, 61 which are connected to the terminals T5, T6 and the input ports 10I1, 10I2 of the microprocessor 10.

Therefore, in the case where the terminal T5 (T6) is in an open state (the first connection state), the voltage level of the input signal SI1 (SI2) input to the input port 10I1 (10I2) is always equal to the control power supply voltage Vcc2 (=+3.3 V), and the microprocessor 10 recognizes this as a high level. Meanwhile, in the case where the terminal T5 (T6) is connected to the ground potential GND (the second connection state), the voltage level of the input signal SI1 (SI2) input to the input port 10I1 (10I2) is always about 0.7 V, which is higher than the ground potential GND by an amount corresponding to the forward voltage of the diodes D1, D2, and the microprocessor 10 recognizes this as a low level.

The microprocessor 10 makes a judgment as to whether the connection state of the terminal T5 (T6) is the open state (the first connection state) or the grounded state (the second connection state) on the basis of the input level of the input port 10I1 (10I2); i.e., by judging whether the voltage level of the input signal SI1 (SI2) input to the input port 10I1 (10I2) is the high level or the low level. For example, in the case where the input level of the input port 10I1 is the high level, the microprocessor 10 judges that the terminal T5 communicating with the input port 10I1 is in an open state (the first connection state), and, in the case where the input level of the input port 10I1 is the low level, the microprocessor 10 judges that the terminal T5 communicating with the input port 10I1 is connected to the ground potential GND (the second connection state) (the input judgment section). The microprocessor 10 makes the same judgment for the terminal T6 communicating with the input port 10I2.

In FIG. 1, since the input level of the input port 10I1 becomes the low level, the microprocessor 10 judges that the terminal T5 is connected to the ground potential GND (the second connection state). Further, since the input level of the input port 10I2 becomes the high level, the microprocessor 10 judges that the terminal T6 is in an open state (the first connection state).

Subsequently, the microprocessor 10 sets the distinguishing ID of the in-vehicle sensor 1 in accordance with the judged connection states of the terminals T5, T6 (the identifier setting section). Specifically, the microprocessor 10 sets the distinguishing ID to a code corresponding to the connection states. In the present Embodiment 1, since the two terminals T5, T6 are provided as external terminals for setting, there exist $2^2=4$ combinations realized by changing the connection states of the two terminals T5, T6, and any of four distinguishing IDs can be set.

Notably, setting of the distinguishing ID is merely required to be performed once at a predetermined timing, for example, when the vehicle VE is started and the microprocessor 10 is powered. The microprocessor 10 stores the distinguishing ID set as described above, and responds to the ECU when the stored distinguishing ID coincides with a distinguishing ID designated by the ECU.

Figure 3:
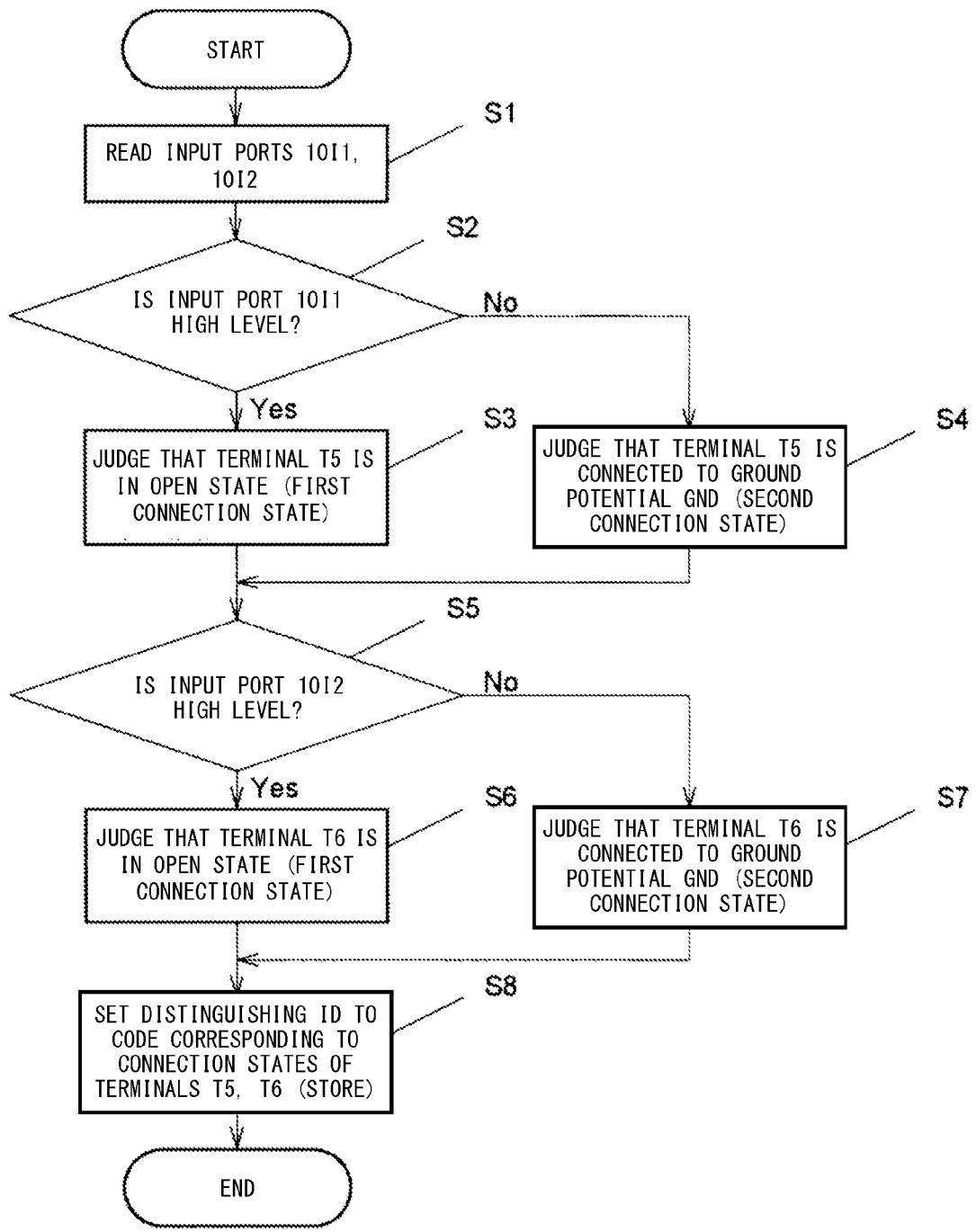
FIG. 3 Flowchart showing operation of a microprocessor of the in-vehicle sensor according to Embodiment 1 at the time of setting a distinguishing ID.

Next, operation of the microprocessor 10 of the in-vehicle sensor 1 according to the present Embodiment 1 at the time of setting a distinguishing ID will be described with reference to the flowchart of FIG. 3. The microprocessor 10 executes this distinguishing ID setting operation only one time after it has has been powered.

First, in step S1, the microprocessor 10 reads the input levels of the two input ports 10I1, 10I2 (input signals SI1, SI2) of the microprocessor 10.

Next, in step S2, the microprocessor 10 judges whether or not the input level of the input port 10I1 read in step S1 is the high level. In the case where the input level of the input port 10I1 is the high level (the result of the judgment in step S2 is Yes), the microprocessor 10 proceeds to step S3, judges that the terminal T5 communicating with the input port 10I1 is in an open state (the first connection state), and then proceeds to step S5. Meanwhile, in the case where the input level of the input port 10I1 is the low level (the result of the judgment in step S2 is No), the microprocessor 10 proceeds to step S4, judges that the terminal T5 communicating with the input port 10I1 is connected to the ground potential GND (the second connection state), and then proceeds to step S5.

In step S5, the microprocessor 10 judges whether or not the input level of the input port 10I2 read in step S1 is the high level. In the case where the input level of the input port 10I2 is the high level (the result of the judgment in step S5 is Yes), the microprocessor 10 proceeds to step S6, judges that the terminal T6 communicating with the input port 10I2 is in an open state (the first connection state), and then proceeds to step S8. Meanwhile, in the case where the input level of the input port 10I2 is the low level (the result of the judgment in step S5 is No), the microprocessor 10 proceeds to step S7, judges that the terminal T6 communicating with the input port 10I2 is connected to the ground potential GND (the second connection state), and then proceeds to step S8.

In step S8, the microprocessor 10 sets the distinguishing ID of the in-vehicle sensor 1 to a code corresponding to the connection states of the two terminals T5, T6, stores the set distinguishing ID in a memory, and ends the distinguishing ID setting operation.

Notably, in the present Embodiment 1, the microprocessor 10 which executes steps S1-S4 and steps S5-S7 corresponds to the level judgment section, and this level judgment section and the level generation circuits 60, 61 correspond to the judgment section. Also, the microprocessor 10 which executes step S8 corresponds to the identifier setting section.

Next, the in-vehicle sensor system 2 shown in FIG. 2 will be described. In the in-vehicle sensor system 2, four in-vehicle sensors 1 according to the present Embodiment 1 which have the same specifications are connected to the CAN bus through use of the four connection paths 100, 200, 300, 400. As described above, the four connection paths 100-400 are the same in terms of the connector specifications of the sensor connection connector 110-410, and the power supply line 120 and the communication connection path 130 are the same among all the connection paths 100-400. However, the connection paths 100-400 differ from one another in terms of the combination of the connection states of the setting path 140, 240, 340, 440 which determines the connection states of the terminals T5, T6 of each in-vehicle sensor 1. Thus, in this in-vehicle sensor system 2, four distinguishing IDs are set by rending the connection states of the terminals T5, T6 of each in-vehicle sensor 1 different from those of other in-vehicle sensors 1.

As having been described, in the in-vehicle sensor 1 of the present Embodiment 1, the terminals T5, T6 (external terminals for setting) for setting a distinguishing ID (identifier) are provided in the bus connection connector 40, and each of the terminals T5, T6 is brought into one of two connection states; i.e., the first connection state (open state) in which it is not connected to any potential outside the in-vehicle sensor 1 and the second connection state (grounded state) in which it is connected to the ground potential GND outside the in-vehicle sensor 1.

The in-vehicle sensor 1 judges, for each of the terminals T5, T6, whether the connection state is the first connection state (open state) or the second connection state (grounded state) on the basis of the input levels of the input signals SI1, SI2 input to the input ports 10I1, 10I2 of the microprocessor 10 (the level judgment section: steps S1-S4 and steps S5-S7), and sets the distinguishing ID used on the CAN bus (the communication bus) to a code corresponding to the judged connection states of the terminals T5, T6 (the identifier setting section: step S8).

Therefore, it is unnecessary to assign a distinguishing ID to the in-vehicle sensor 1 in advance. When the in-vehicle sensor 1 is connected to the CAN bus through use of the bus connection connector 40 and is installed in the vehicle, at the installed location, the terminals T5, T6 of the bus connection connector 40 are brought into connection states corresponding to the installed location, whereby the distinguishing ID of the in-vehicle sensor 1 is set. Therefore, a plurality of in-vehicle sensors 1 of the same type can be used.

In addition, in this in-vehicle sensor 1, each of the terminals T5, T6 is brought into an open state (the first connection state) or is connected to the ground potential GND (the second connection state), and is not connected the power supply potential VB supplied externally (the battery BT mounted on the vehicle VE) or other potentials generated from the power supply potential VB, etc. outside the in-vehicle sensor 1. Therefore, the terminals T5, T6 are unlikely to receive noise generated as a result of superimposition of surge voltage on the externally supplied power supply potential VB or other potentials. Thus, an erroneous judgment is unlikely to be made due to noise, and it is possible to properly judge the connection states of the terminals T5, T6 and correctly set the distinguishing ID.

Furthermore, in the in-vehicle sensor 1 of the present Embodiment 1, the input signals SI1, SI2 whose levels become high or low depending on the connection states of the terminals T5, T6 (the first connection state (open state) or the second connection state (grounded state)) are generated by the level generation circuits 60, 61 and are input to the input ports 10I1, 10I2 of the microprocessor 10. Also, the level judgment section (steps S1-S4 and steps S5-S7) in the microprocessor 10 judges whether each of the terminals T5, T6 communicating with the input ports 10I1, 10I2 is in the first connection state (open state) or in the second connection state (grounded state) on the basis of the input levels of the input signals SI1, SI2 input to the input ports 10I1, 10I2.

By virtue of this, the connection states of the terminals T5, T6 can be judged properly on the basis of the input levels of the input signals SI1, SI2 input to the input ports 10I1, 10I2 of the microprocessor 10.

In the in-vehicle sensor 1 of the present Embodiment 1, the level generation circuits 60, 61 connect the terminals T5, T6 to the control power supply voltage Vcc2 (potential for judgment) through the resistors R1, R2. Therefore, the potential of the terminal T5 (T6) does not become unstable even when the connection state of the terminal T5 (T6) is the first connection state (open state), and the potential of the terminal T5 (T6) is determined in accordance with the connection state thereof (the first connection state (open state) or the second connection state (grounded state)). By virtue of this, the level generation circuits 60, 61 can generate proper input signals SI1, SI2 by using the determined potentials of the terminals T5, T6. Therefore, the connection states can be properly judges through use of the input signals SI1, SI2.

Also, the in-vehicle sensor system 2 in which a plurality of (four) in-vehicle sensors 1 according to the present Embodiment 1 are connected has the connection paths 100, 200, 300, 400 including the sensor connection connectors 110 mated with the bus connection connectors 40 of the corresponding in-vehicle sensors 1. The setting paths 140, 240, 340, 440 of the connection paths 100, etc. each of which sets the connection state of each of the terminals T5, T6 of the corresponding bus connection connector 40 to the first connection state (open state) or the second connection state (grounded state) differ from one another in terms of the combination of the connection states of the terminals T5, T6 set by the setting paths. By virtue of this, it is possible to set different distinguishing IDs for the four in-vehicle sensors 1 by merely connecting the bus connection connectors 40 of the four in-vehicle sensors 1 to the sensor connection connectors 110-410 of the connection paths 100-400. As described above, there can be obtained the in-vehicle sensor system 2 which eliminates the necessity of assigning distinguishing IDs in advance, and which can use a plurality of in-vehicle sensors 1 of the same type having the same specifications by setting the distinguishing IDs of the in-vehicle sensors 1 such that they differ from one another.

Modified Embodiments 1, 2

Next, modified embodiments in which the configurations of the level generation circuits 60, 61 of the above-described Embodiment 1 are changed will be described with reference to FIGS. 4 and 5.

In the in-vehicle sensor 1 according to the above-described Embodiment 1, the terminals T5, T6 are connected to the control power supply voltage Vcc2 through the protection diodes D1, D2 and the resistors R1, R2, respectively, and the anodes of the diodes D1, D2 are connected to the input ports 10I1, 10I2 of the microprocessor 10. The diodes D1, D2 and the resistors R1, R2 constitute the level generation circuits 60, 61 which are connected to the terminals T5, T6 and the input ports 10I1, 10I2 of the microprocessor 10.

Figure 4:
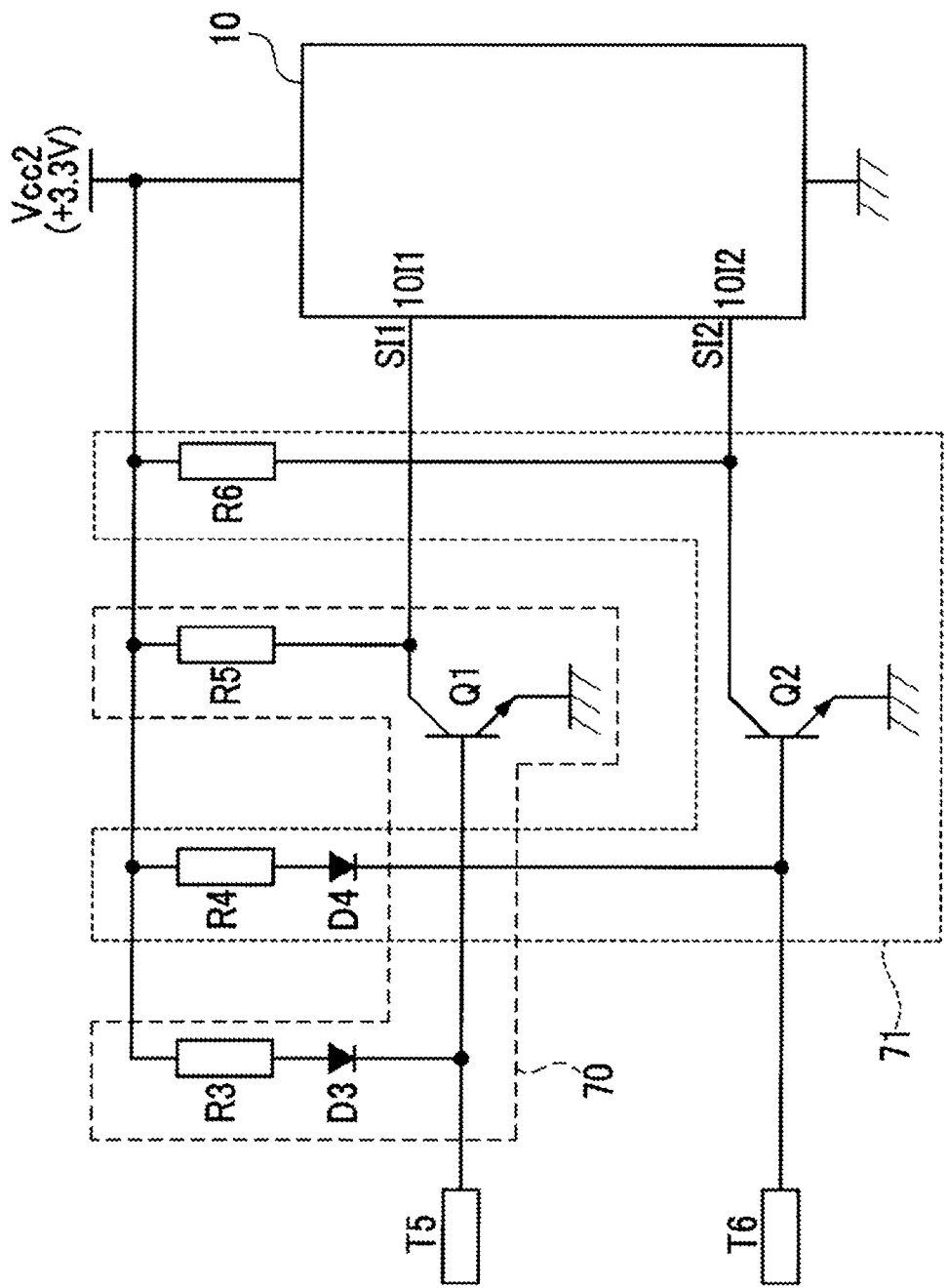
FIG. 4 Explanatory diagram showing the configuration of a level generation circuit of Modified Embodiment 1.

In contrast, in Modified Embodiment 1 shown in FIG. 4, the terminals T5, T6 are connected to the bases of the transistors Q1, Q2, and are connected to the cathodes of the diodes D3, D4 for protection. The anodes of the diodes D3, D4 are connected to the control power supply voltage Vcc2 (=+3.3 V) through the resistors R3, R4, respectively. Namely, the terminals T5, T6 are connected to the control power supply voltage Vcc2 through the diodes D3, D4 for protection and the resistors R3, R4, respectively. The emitters of the transistors Q1, Q2 are connected to the ground potential GND, and the collectors of the transistors Q1, Q2 are connected to the control power supply voltage Vcc2 through resistors R5, R6 and are connected to the input ports 10I1, 10I2 of the microprocessor 10. Level generation circuits 70, 71 are constituted by the diodes D3, D4, the resistors R3, R4, the transistors Q1, Q2, and the resistors R5, R6. Notably, in the present Modified Embodiment 1 as well, as in the case of Embodiment 1, the potential of the control power supply voltage Vcc2 (+3.3 V) corresponds to the potential for judgment, and the stabilized power supply circuit 30 corresponds to the potential generation section.

As a result, the level generation circuits 70, 71 operate as follows. When the terminal T5 (T6) is opened (the first connection state), the transistor Q1 (Q2) is turned on, because the base of the transistor Q1 (Q2) is connected to the control power supply voltage Vcc2 through the diode D3 (D4) and the resistor R3 (R4). Therefore, the input level (voltage level) of the input signal SI1 (SI2) input to the input port 10I1 (10I2) connected to the collector of the transistor Q1 (Q2) always becomes low. Meanwhile, in the case where the terminal T5 (T6) is connected to the ground potential GND (the second connection state), the transistor Q1 (Q2) is turned off, because the base of the transistor Q1 (Q2) is connected to the ground potential GND. Therefore, the input level (voltage level) of the input signal SI1 (SI2) input to the input port 10I1 (10I2) connected to the control power supply voltage Vcc2 through the resistor R5 (R6) always becomes high.

Therefore, when the input level of the input port 10I1 is low, the microprocessor 10 judges that the terminal T5 communicating with the input port 10I1 is in an open state (the first connection state), and, when the input level of the input port 10I1 is high, the microprocessor 10 judges that the terminal T5 communicating with the input port 10I1 is connected to the ground potential GND (the second connection state). The microprocessor 10 makes the same judgment for the terminal T6 communicating with the input port 10I2. Namely, the level generation circuits 70, 71 of the present Modified Embodiment 1 are reverse to the level generation circuits 60, 61 of Embodiment 1 in terms of the relation between the connection states and the input levels (high levels or low levels) of the input ports 10I1, 10I2 corresponding thereto. However, as in the case of Embodiment 1, the connection states of the terminals T5, T6 can be judged on the basis of the input levels of the input ports 10I1, 10I2.

Accordingly, even in the case where the level generation circuits 70, 71 of the present Modified Embodiment 1 are used in place of the level generation circuits 60, 61 of Embodiment 1, there are attained the same action and effect as those of Embodiment 1. Namely, it is unnecessary to assign a distinguishing ID to the in-vehicle sensor 1 in advance, and a plurality of in-vehicle sensors 1 of the same type can be used by means of setting a distinguishing ID to each in-vehicle sensor 1, which setting is performed by bringing the connection states of the terminals T5, T6 of the bus connection connector 40 into connection states corresponding to the installed location thereof. Furthermore, since the terminals T5, T6 of the in-vehicle sensor 1 are not connected the externally supplied power supply potential VB or other potentials, the terminals T5, T6 are unlikely to receive noise generated as a result of superimposition of surge voltage on the externally supplied power supply potential VB or other potentials.

Figure 5:
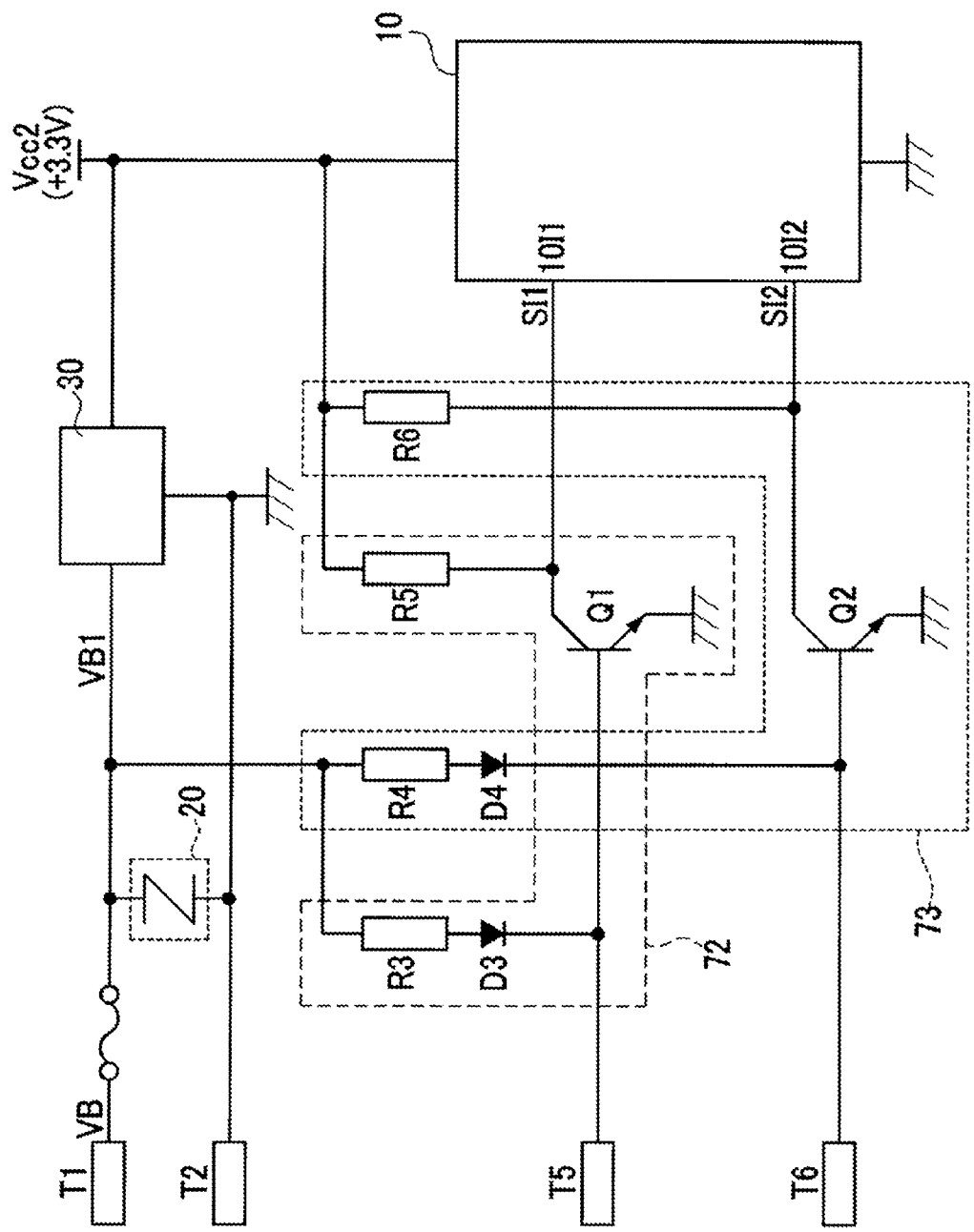
FIG. 5 Explanatory diagram showing the configuration of a level generation circuit of Modified Embodiment 2.

Level generation circuits 72, 73 of Modified Embodiment 2 shown in FIG. 5 have configurations approximately the same as those of the level generation circuits 70, 71 of Modified Embodiment 1. However, the level generation circuits 72, 73 differ from the level generation circuits 70, 71 in the point in that the resistors R3, R4 are connected to the output potential VB1 of the surge protection circuit 20 formed by a varistor, etc., rather than to the control power supply voltage Vcc2 of Modified Embodiment 1. Namely, in the present Modified Embodiment 2, the terminals T5, T6 are connected to the output potential VB1 of the surge protection circuit 20 through the diodes D3, D4 and the resistors R3, R4, respectively. In the present Modified Embodiment 2, the output potential VB1 of the surge protection circuit 20 corresponds to the potential for judgment, and the surge protection circuit 20 corresponds to the potential generation section.

Even in the case where the level generation circuits 72, 73 of the present Modified Embodiment 2 are used in place of the level generation circuits 60, 61 of Embodiment 1, as in the case of Modified Embodiment 1, there are attained the same action and effect as those of Embodiment 1. Namely, it is unnecessary to assign a distinguishing ID to the in-vehicle sensor 1 in advance, and the terminals T5, T6 are unlikely to receive noise.

Embodiment 2

Next, a second embodiment of the present invention will be described with reference to FIG. 6. An in-vehicle sensor 1A according to the present Embodiment 2 has a configuration approximately the same as that of the in-vehicle sensor 1 according to Embodiment 1. However, the connection between the terminals T5, T6 (external terminals for setting) and a microprocessor 10A in the in-vehicle sensor 1A of the present Embodiment 2 differs from that in the in-vehicle sensor 1 of Embodiment 1. Notably, the microprocessor 10A has input ports 10I1, 10I2 which are digital input signal ports (I/O input ports) and output ports 10O1, 10O2 which are digital output signal ports (I/O output ports).

In the following, portions of the present Embodiment 2 different from those of Embodiment 1 will be described, and descriptions of portions identical with those of Embodiment 1 are omitted.

As in the case of Embodiment 1, the terminals T5, T6 of the bus connection connector 40 are external terminals for setting each of which is brought into one of two connection states; i.e., the first connection state (open state) in which it is not connected to any potential outside the in-vehicle sensor 1A and the second connection state (grounded state) in which it is connected to the ground potential GND outside the in-vehicle sensor 1A. Notably, in FIG. 6, the terminal T5 is connected to the ground potential GND (the second connection state) and the terminal T6 is brought into an open state (the first connection state) by the setting path 140 (the line 141 indicated by a continuous line and the un-existing line 142 indicated by a broken line) of the connection path 100.

Figure 6:
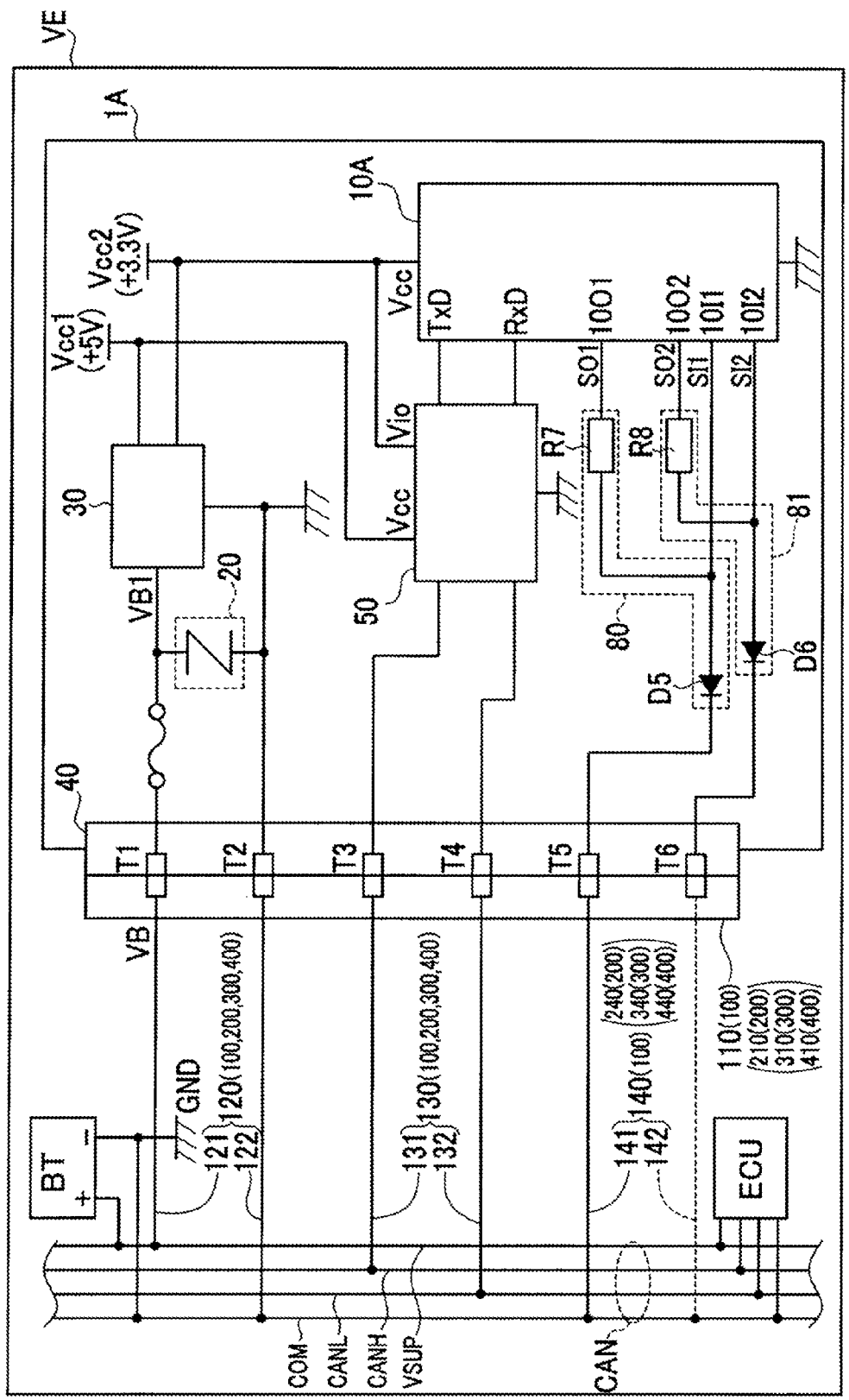
FIG. 6 Explanatory diagram schematically showing the configuration of an in-vehicle sensor according to Embodiment 2.

As shown in FIG. 6, these two terminals T5, T6 are connected to the cathodes of diodes D5, D6 for protection against surge noise or the like, and the anodes of these diodes D5, D6 are connected to the input ports 10I1, 10I2 of the microprocessor 10A. The input ports 10I1, 10I2 connected to the anodes of the diodes D5, D6 are connected to the output ports 10O1, 10O2 of the microprocessor 10A through resistors R7, R8, respectively. The diodes D5, D6 and resistors R7, R8 constitute input generation circuits 80, 81 which are connected to the terminals T5, T6, the input ports 10I1, 10I2, and the output ports 10O1, 10O2.

At the time of setting the distinguishing ID at a predetermined timing, for example, at the time when the microprocessor 10A is powered, the microprocessor 10A changes the output signals SO1, SO2 output from the output ports 10O1, 10O2 between the high level and the low level (the output changing section). Specifically, for example, in the case where the input level of the input signal SI1, SI2 input to the input port 10I1 changes in response to the change of the output signal SO1, SO2 between the high level and the low level, the microprocessor 10A judges that the terminal T5 communicating with the input port 10I1 is in an open state (the first connection state), and, in the case where the input level of the input signal SI1, SI2 input to the input port 10I1 is fixed to the low level and does not change, the microprocessor 10A judges that the terminal T5 communicating with the input port 10I1 is connected to the ground potential GND (the second connection state) (the response judgment section). The microprocessor 10A makes the same judgment for the terminal T6 communicating with the input port 10I2 and the output port 10O2. Namely, in the present Embodiment 2, the input signal SI1 (SI2) (a first input signal) at the time when the connection state of the terminal T5 (T6) is the first connection state (open state) changes in accordance with the change of the output signal SO1 (SO2), and the input signal SI1 (SI2) (a second input signal) at the time when the connection state of the terminal T5 (T6) is the second connection state (grounded state) does not change irrespective of the output signal SO1 (SO2). The microprocessor 10A determines the connection state of the terminal T5 (T6) on the basis of the difference in response between the first input signal and the second input signal.

The microprocessor 10A sets the distinguishing ID of the in-vehicle sensor 1A on the basis of the connection states of the terminals T5, T6 (the identifier setting section). In the present Embodiment 2, as in the case of Embodiment 1, the two terminals T5, T6 are provided as external terminals for setting. Therefore, there exist $2^2=4$ combinations realized by changing the connection states of the two terminals T5, T6, and any of four distinguishing IDs can be set.

Figure 7:
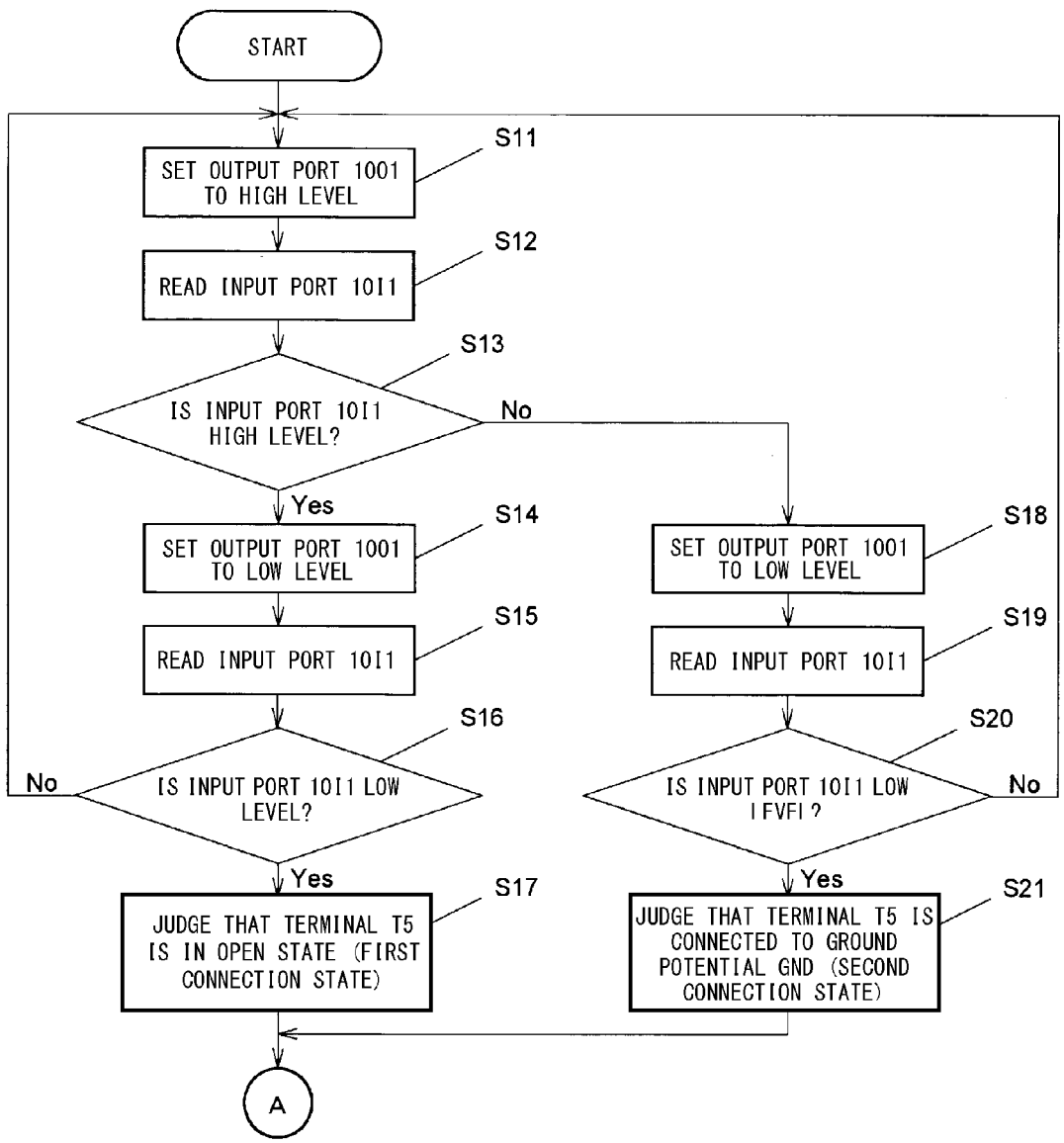
FIG. 7 Flowchart showing a first half of operation of a microprocessor of the in-vehicle sensor according to Embodiment 2 at the time of setting a distinguishing ID.
Figure 8:
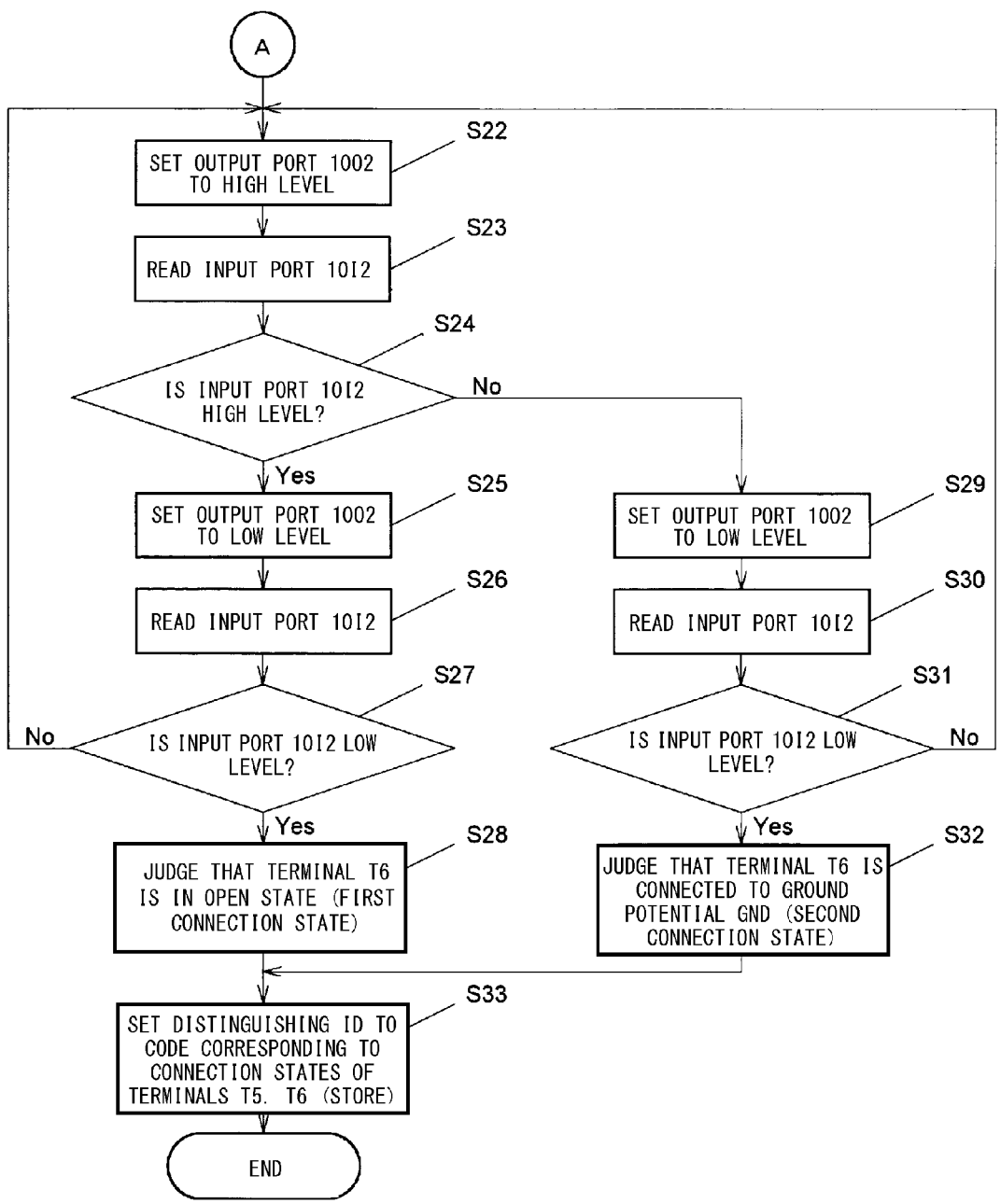
FIG. 8 Flowchart showing a second half of the operation of the microprocessor of the in-vehicle sensor according to Embodiment 2 at the time of setting a distinguishing ID.

Next, operation of the microprocessor 10A of the in-vehicle sensor 1A according to the present Embodiment 2 at the time of distinguishing ID setting will be described with reference to the flowcharts of FIGS. 7 and 8. Notably, FIG. 7 is a flowchart showing a first half of the operation at the time of distinguishing ID setting, and FIG. 8 is a flowchart showing a second half of the operation. The microprocessor 10A executes this distinguishing ID setting operation only one time after it has has been powered.

First, in step S11 shown in FIG. 7, the microprocessor 10A sets the output port 10O1 (the output signal SO1) thereof to the high level so as to start the judgment of the connection state of the terminal T5. In step S12 subsequent thereto, the microprocessor 10A reads the input level of the input port 10I1 (the input signal SI1) of the microprocessor 10A.

Next, in step S13, the microprocessor 10A judges whether or not the input level of the input port 10I1 read in step S12 is the high level. In the case where the input level of the input port 10I1 is the high level (the result of the judgment in step S13 is Yes), the microprocessor 10A proceeds to step S14. Meanwhile, in the case where the input level of the input port 10I1 is the low level (the result of the judgment in step S13 is No), the microprocessor 10A proceeds to step S18.

In step S14, the microprocessor 10A sets the output port 10O1 (the output signal SO1) to the low level to thereby change the output port 10O1 (the output signal SO1) from the high level to the low level, and, in step S15 subsequent thereto, reads the input level of the input port 10I1 (the input signal SI1).

In step S16 subsequent thereto, the microprocessor 10A judges whether or not the input level of the input port 10I1 read in step S15 is the low level. In the case where the input level of the input port 10I1 is the low level (the result of the judgment in step S16 is Yes), the microprocessor 10A proceeds to step S17. In this case, since the input level of the input port 10I1 changes in synchronism with the change of the output port 10O1 (the output signal SO1) between the high level and the low level, the microprocessor 10A judges that the terminal T5 communicating with the input port 10I1 is in an open state (the first connection state), and proceeds to step S22 shown in FIG. 8. In the case where the result of the judgment in step S16 is No, it is an anomalous case. Therefore, the microprocessor 10A returns to step S11 and again performs the operation of judging the connection state of the terminal T5 from the beginning.

In the case where the microprocessor 10A proceeds from step S13 to step S18 as well, as in the case of step S14, the microprocessor 10A sets the output port 10O1 (the output signal SO1) to the low level to thereby change the output port 10O1 (the output signal SO1) from the high level to the low level, and, in step S19 subsequent thereto, reads the input level of the input port 10I1 (the input signal SI1).

In step S20 subsequent thereto, the microprocessor 10A judges whether or not the input level of the input port 10I1 read in step S19 is the low level. In the case where the input level of the input port 10I1 is the low level (the result of the judgment in step S20 is Yes), the microprocessor 10A proceeds to step S21. In this case, since the input level of the input port 10I1 is fixed to the low level irrespective of the change of the output port 10O1 between the high level and the low level, the microprocessor 10A judges that the terminal T5 communicating with the input port 10I1 is connected to the ground potential GND (the second connection state), and proceeds to step S22 shown in FIG. 8. In the case where the result of the judgment in step S20 is No, it is an anomalous case. Therefore, the microprocessor 10A returns to step S11 and again performs the operation of judging the connection state of the terminal T5 from the beginning, as in the case where the result of the judgment in step S16 is No. Notably, in these anomalous cases, the microprocessor 10A may perform error processing instead of returning to step S11.

In step S22, the microprocessor 10A sets the output port 10O2 (the output signal SO2) thereof to the high level so as to start the judgment of the connection state of the terminal T6. In step S23 subsequent thereto, the microprocessor 10A reads the input level of the input port 10I2 (the input signal SI2) of the microprocessor 10A.

Next, in step S24, the microprocessor 10A judges whether or not the input level of the input port 10I2 read in step S23 is the high level. In the case where the input level of the input port 10I2 is the high level (the result of the judgment in step S24 is Yes), the microprocessor 10A proceeds to step S25. Meanwhile, in the case where the input level of the input port 10I2 is the low level (the result of the judgment in step S24 is No), the microprocessor 10A proceeds to step S29.

In step S25, the microprocessor 10A sets the output port 10O2 (the output signal SO2) to the low level to thereby change the output port 10O2 (the output signal SO2) from the high level to the low level, and, in step S26 subsequent thereto, reads the input level of the input port 10I2 (the input signal SI2).

In step S27 subsequent thereto, the microprocessor 10A judges whether or not the input level of the input port 10I2 read in step S26 is the low level. In the case where the input level of the input port 10I2 is the low level (the result of the judgment in step S27 is Yes), the microprocessor 10A proceeds to step S28. In this case, since the input level of the input port 10I2 changes in synchronism with the change of the output port 10O2 (the output signal SO2) between the high level and the low level, the microprocessor 10A judges that the terminal T6 communicating with the input port 10I2 is in an open state (the first connection state), and proceeds to step S33. In the case where the result of the judgment in step S27 is No, it is an anomalous case. Therefore, the microprocessor 10A returns to step S22 and again performs the operation of judging the connection state of the terminal T6 from the beginning.

In the case where the microprocessor 10A proceeds from step S24 to step S29 as well, as in the case of step S25, the microprocessor 10A sets the output port 10O2 (the output signal SO2) to the low level to thereby change the output port 10O2 (the output signal SO2) from the high level to the low level, and, in step S30 subsequent thereto, reads the input level of the input port 10I2 (the input signal SI2).

In step S31 subsequent thereto, the microprocessor 10A judges whether or not the input level of the input port 10I2 read in step S30 is the low level. In the case where the input level of the input port 10I2 is the low level (the result of the judgment in step S31 is Yes), the microprocessor 10A proceeds to step S32. In this case, since the input level of the input port 10I2 is fixed to the low level irrespective of the change of the output port 10O2 between the high level and the low level, the microprocessor 10A judges that the terminal T6 communicating with the input port 10I2 is connected to the ground potential GND (the second connection state), and proceeds to step S33. In the case where the result of the judgment in step S31 is No, it is an anomalous case. Therefore, the microprocessor 10A returns to step S22 and again performs the operation of judging the connection state of the terminal T6 from the beginning, as in the case where the result of the judgment in step S27 is No. Notably, in these anomalous cases, the microprocessor 10A may perform error processing instead of returning to step S22.

In step S33, the microprocessor 10A sets the distinguishing ID of the in-vehicle sensor 1A to a code corresponding to the connection states of the two terminals T5, T6, stores the set distinguishing ID in a memory, and ends the distinguishing ID setting operation.

Notably, in the present Embodiment 2, the input generation circuits 80, 81 and the microprocessor 10A which executes steps S11-S21 and steps S22-S32 correspond to the judgment section. Of these, the microprocessor 10A which executes steps S11, S14, S18 and steps S22, S25, S29 corresponds to the output changing section, and the microprocessor 10A which executes steps S12-S13, S15-S17, S19-S21 and steps S23-S24, S26-S28, S30-S32 corresponds to the response judgment section. Also, the microprocessor 10A which executes step S33 corresponds to the identifier setting section.

Notably, the in-vehicle sensor 1A according to the present Embodiment 2 can be used in the same manner as the in-vehicle sensor 1 of Embodiment 1. Four in-vehicle sensors 1A having the same specifications are connected to the CAN bus through use of the connection paths 100, 200, 300, 400, whereby the connection states of the terminals T5, T6 of each in-vehicle sensor 1A are rendered different from those of other in-vehicle sensors 1A. Thus, four distinguishing IDs can be set for the four in-vehicle sensors 1A (see FIG. 2).

As having been described above, the in-vehicle sensor 1A of the present Embodiment 2 is configured such that the input signals SI1, SI2 (the first input signal and the second input signal) which differ from each other in terms of response to changes of the output signals SO1, SO2 output from the output ports 10O1, 10O2 of the microprocessor 10A are generated, by the input generation circuits 80, 81, depending on whether the connection state of each of the terminals T5, T6 is the first connection state (open state) or the second connection state (grounded state), and the generated input signals SI1, SI2 are input to the input ports 10I1, 10I2 of the microprocessor 10A. The output signals SO1, SO2 output from the output ports 10O1, 10O2 are changed by the output changing section (steps S11, S14, S18, S22, S25, S29) in the microprocessor 10A, and the connection states of the terminals T5, T6 are judged by the input judgment section (steps S12-S13, S15-S17, S19-S21, S23-S24, S26-S28, S30-S32) in the microprocessor 10A through use of the responses of the input signals SI1, SI2 (input to the input port 10I1) to the changes of the output signals SO1, SO2. Specifically, in the case where the input level of the input signal SI1 input to the input port 10I1 changes in accordance with the change of the output signal SO1 output from the output port 10O1 between the high level and the low level (the first input signal), the microprocessor 10A judges that the terminal T5 communicating with the input port 10I1 is in an open state (the first connection state). In the case where the input level of the input signal SI1 input to the input port 10I1 is fixed to the low level and does not change (the second input signal), the microprocessor 10A judges that the terminal T5 communicating with the input port 10I1 is connected to the ground potential GND (the second connection state). The microprocessor 10A makes the same judgment for the terminal T6.

By virtue of this, the microprocessor 10A can judge the connection states of the terminals T5, T6 properly on the basis of the responses of the input signals SI1, SI2 (input to the input ports 10I1, 10I2) to the changes of the output signals SO1, SO2 output from the output ports 10O1, 10O2 of the microprocessor 10A.

Furthermore, in the in-vehicle sensor 1A of the present Embodiment 2, the input generation circuits 80, 81 connect the input ports 10I1, 10I2 of the microprocessor 10A to the terminals T5, T6 via the diodes D5, D6, and connect the input ports 10I1, 10I2 to the output ports 10O1, 10O2 via the resistors R7, R8.

By virtue of this, when the connection state of the terminal T5 (T6) is the first connection state (open state), the input signal SI1 (SI2) changes in synchronism with the change of the output signal SO1 (SO2) output from the output port 10O1 (10O2), and, when the connection state of the terminal T5 (T6) is the second connection state (grounded state), the input signal SI1 (SI2) does not change in synchronism with the change of the output signal SO1 (SO2), and is fixed to the low level.

Accordingly, this in-vehicle sensor 1A can properly judges the connection states of the terminals T5, T6 by using the input generation circuits 80, 81 each having a simple configuration.

Since the in-vehicle sensor 1A of the present Embodiment 2 provides an action and effects similar to those of Embodiment 1, the in-vehicle sensor 1A may be applied to the in-vehicle sensor system 2 of FIG. 2 in place of the in-vehicle sensor 1 of Embodiment 1. As a result, there can be obtained an in-vehicle sensor system 2 in which different distinguishing IDs can be set for the four in-vehicle sensors 1A by merely connecting the bus connection connectors 40 of the four in-vehicle sensors 1A to the sensor connection connectors 110-410 of the connection paths 100-400, respectively. Thus, it becomes unnecessary to assign a distinguishing ID to each in-vehicle sensor 1A in advance.

Modified Embodiment 3

Next, a modified embodiment in which the configurations of the input generation circuits 80, 81 of the above-described Embodiment 2 are changed will be described with reference to FIG. 9.

As can be found through comparison between FIG. 6 and FIG. 1, the input generation circuits 80, 81 of the above-described Embodiment 2 are similar in circuit configuration to the level generation circuits 60, 61 of Embodiment 1. Specifically, in the level generation circuits 60, 61 of Embodiment 1, the resistors R1, R2 are connected to the constant control power supply voltage Vcc2. In contrast, in the input generation circuits 80, 81 of Embodiment 2, the resistors R7, R8 are connected to the output ports 10O1, 10O2 of the microprocessor 10A, and the output signals SO1, SO2 output from the output ports 10O1, 10O2 are changed. Although the input generation circuits 80, 81 of Embodiment 2 differ from the level generation circuits 60, 61 of Embodiment 1 in the above-described point, the input generation circuits 80, 81 are identical to the level generation circuits 60, 61 in the remaining configuration.

Figure 9:
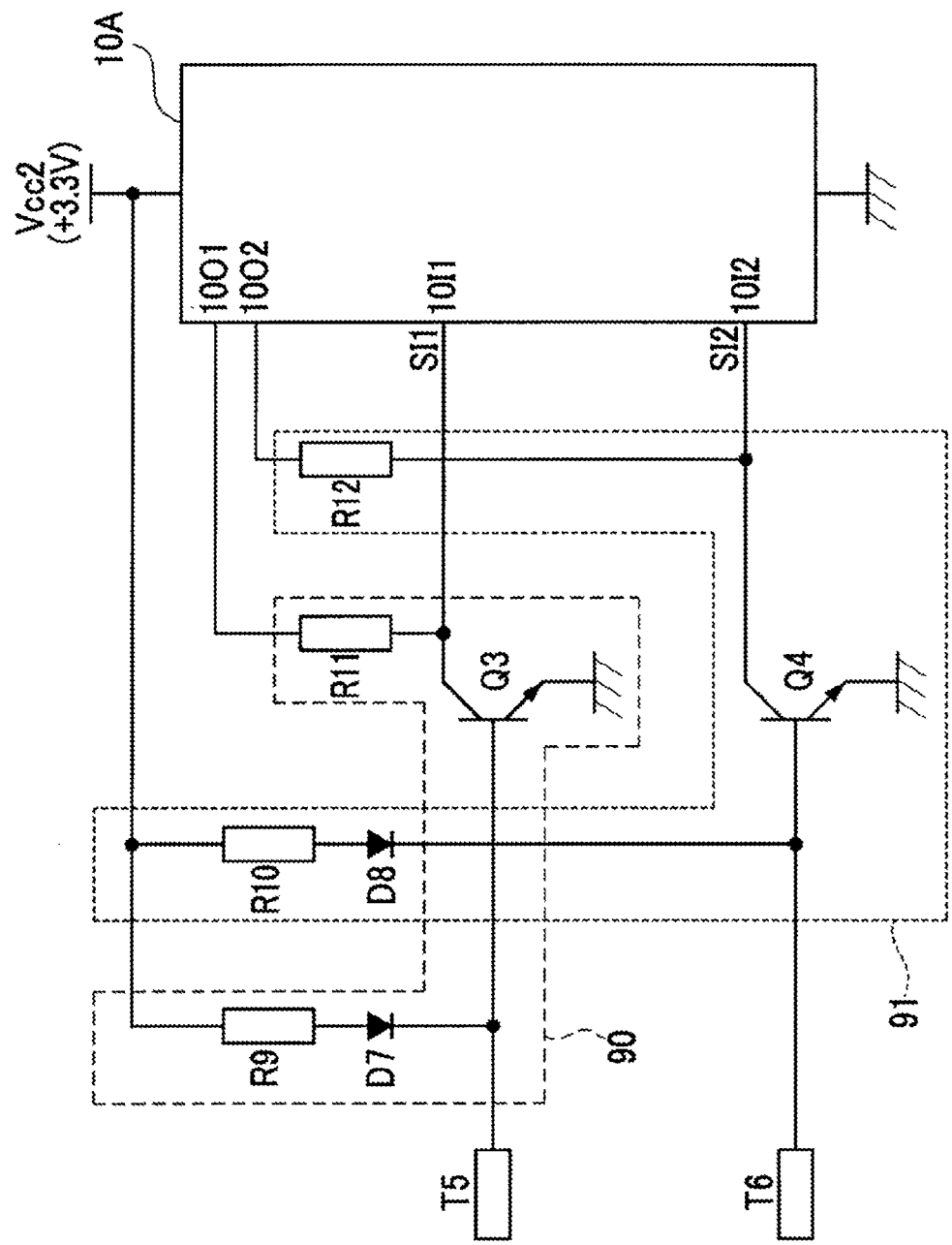
FIG. 9 Explanatory diagram showing the configuration of an input generation circuit of Modified Embodiment 3.

Meanwhile, input generation circuits 90, 91 of Modified Embodiment 3 shown in FIG. 9 are similar in circuit configuration to the level generation circuits 70, 71 of Modified Embodiment 1 (see FIG. 4).

In the present Modified Embodiment 3, the terminals T5, T6 are connected to the bases of the transistors Q3, Q4, respectively, and are also connected to the cathodes of diodes D7, D8 for protection. The anodes of the diodes D7, D8 are connected to the control power supply voltage Vcc2 (=+3.3 V) through resistors R9, R10, respectively. The emitters of the transistors Q3, Q4 are grounded to the ground potential GND. The collectors of the transistors Q3, Q4 are connected to the output ports 10O1, 10O2 of the microprocessor 10A through resistors R11, R12, respectively, and are also connected to the input ports 10I1, 10I2 of the microprocessor 10A. The input generation circuits 90, 91 are constituted by the diodes D7, D8, the resistors R9, R10, the transistors Q3, Q4, and the resistors R11, R12, and the microprocessor 10A changes the output signals SO1, SO2 output from the output ports 10O1, 10O2 between the high level and the low level.

Accordingly, the input generation circuits 90, 91 of the present Modified Embodiment 3 are identical in configuration to the level generation circuits 70, 71 of Modified Embodiment 1 except the following point. In contrast to the level generation circuits 70, 71 of Modified Embodiment 1 in which the resistors R5, R6 are connected to the constant control power supply voltage Vcc2, in the input generation circuits 90, 91 of the present Modified Embodiment 3, the resistors R11, R12 are connected to the output ports 10O1, 10O2 of the microprocessor 10A, and the output signals SO1, SO2 output from the output ports 10O1, 10O2 are changed.

In the present Modified Embodiment 3, when the terminal T5 (T6) is opened (the first connection state), the transistor Q3 (Q4) is turned on, because the base of the transistor Q3 (Q4) is connected to the control power supply voltage Vcc2 through the diode D7 (D8) and the resistor R9 (R10). Therefore, even when the output signal SO1 (SO2) output from the output port 10O1 (10O2) is changed, irrespective of the change of the output signal SO1 (SO2), the input level of the input signal SI1 (SI2) input to the input port 10I1 (10I2) connected to the collector of the transistor Q3 (Q4) always becomes low. Meanwhile, when the terminal T5 (T6) is connected to the ground potential GND (the second connection state), the transistor Q3 (Q4) is turned off, because the base of the transistor Q3 (Q4) is connected to the ground potential GND. Therefore, when the output signal SO1 (SO2) output from the output port 10O1 (10O2) is changed, the input signal SI1 (SI2) input to the input port 10I1 (10I2) connected to the output port 10O1 (10O2) through the resistor R11 (R12) also changes in synchronism with the change of the output signal SO1 (SO2).

By virtue of this, the in-vehicle sensor 1A of Embodiment 2 can use the input generation circuits 90, 91 of Modified Embodiment 3 in place of the input generation circuits 80, 81, and provides the same action and effects.

In the above, the present invention has been described on the basis of Embodiments 1, 2 and Modified Embodiments 1-3. However, needless to say, the present invention is not limited to the above-described embodiments and modified embodiments, and may be freely changed for application without departing from the gist of the invention.

For examples, in the embodiments and the modified embodiments, the two terminals T5, T6 are provided as external terminals for setting, whereby $2^2=4$ distinguishing IDs can be set. However, the number of external terminals for setting can be freely changed in accordance with the number of in-vehicle sensors 1 connected to the communication bus. When n external terminals for setting are provided, $2^n$ distinguishing IDs can be set.

Also, in the embodiments and the modified embodiments, the in-vehicle sensors 1 are sensors connected to the CAN bus. However, the present invention may be applied to in-vehicle sensors connected to a communication bus, other than the CAN bus, for example, to a LIN bus.

Also, in Embodiment 1 and Modified Embodiment 1, the control power supply voltage Vcc2 generated by the stabilized power supply circuit 30 and driving the microprocessor 10 is used as the potential for judgment, and, in Modified Embodiment 2, the output potential VB1 of the surge protection circuit 20 is used as the potential for judgment. However, the potential for judgment may be generated by a separate dedicated circuit.

Also, the two input ports 10I1, 10I2 of Embodiment 1 and Modified Embodiments 1, 2 are digital input signal port (I/O input ports). However, analog input signal ports (A/D input ports) may be used. Similarly, in the case of Embodiment 2 and Modified Embodiment 3, analog output signal ports (D/A output ports) may be used as the output ports 10O1, 10O2 in place of the digital output signal ports (I/O output ports), and A/D input ports may be used as the input ports 10I1, 10I2.

Furthermore, in Embodiment 2 and Modified Embodiment 3, the output signals SO1, SO2 output from the output ports 10O1, 10O2 are changed through use of the input generation circuits 80, 81 and the input generation circuits 90, 91, respectively, and the connection states of the terminals T5, T6 are judged through use of the responses of the input signals SI1, SI2 (input to the input ports 10I1, 10I2). However, as described above, the input generation circuits 80, 81 of Embodiment 2 resemble to the level generation circuits 60, 61 of Embodiment 1, and the input generation circuits 90, 91 of Modified Embodiment 3 resemble to the level generation circuits 70, 71 of Modified Embodiment 1. Therefore, when the output signals SO1, SO2 output from the output ports 10O1, 10O2 of the microprocessor 10A are fixed to the high level, the input generation circuits 80, 81 and the input generation circuits 90, 91 operate in the same manner as the level generation circuits 60, 61 and the level generation circuits 70, 71, respectively. Accordingly, by fixing the output signals SO1, SO2 to the high level, the input generation circuits 80, 81 of Embodiment 2 and the input generation circuits 90, 91 of Modified Embodiment 3 may be used as level generation circuits.

DESCRIPTION OF SYMBOLS

VE vehicle
1, 1A in-vehicle sensor
2 in-vehicle sensor system
10, 10A microprocessor
10I1, 10I2 input port
10O1, 10O2 output port
R1, R2, R3, R4, R7, R8 resistor
20 surge protection circuit
30 stabilized power supply circuit (potential generation section)
40 bus connection connector
T1 terminal (power supply terminal)
T2 terminal (ground terminal)
T3 terminal (communication external terminal)
T4 terminal (communication external terminal)
T5 terminal (external terminal for setting)
T6 terminal (external terminal for setting)
60, 61, 70, 71, 72, 73 level generation circuit
80, 81, 90, 91 input generation circuit
VB power supply potential
GND ground potential
Vcc2 control power supply voltage (potential for judgment)
CAN CAN bus (communication bus)
CANH, CANL communication line
100, 200, 300, 400 connection path
110, 210, 310, 410 sensor connection connector
130 communication connection path
140, 240, 340, 440 setting path
S1-S4, S5-S7 level judgment section (judgment section)
S11, S14, S18, S22, S25, S29 output changing section (judgment section)
S12-S13, S15-S17, S19-S21, S23-S24, S26-S28,
S30-S32 response judgment section (judgment section)
S8, S33 identifier setting section

The invention claimed is:

1. An in-vehicle sensor which is to be mounted on a vehicle and is to be connected to a communication bus constructed in the vehicle, comprising:
a bus connection connector used for connection to the communication bus and including one or a plurality of communication external terminals to be connected to a communication line of the communication bus through which communication data flow, and one or a plurality of external terminals for setting each brought into a connection state which is either of a first connection state in which it is not connected to any potential outside the in-vehicle sensor and a second connection state in which it is connected to a ground potential outside the in-vehicle sensor;
a judgment section which judges for the one or plurality of external terminals for setting whether the connection state is the first connection state or the second connection state;
an identifier setting section which sets an identifier of the in-vehicle sensor used on the communication bus on the basis of the judged connection state(s) of the one or plurality of external terminals for setting; and
a microprocessor having an input signal port to which an input signal is input.

2. An in-vehicle sensor as claimed in claim 1, wherein the judgment section comprises:
a level generation circuit which is connected to the external terminal for setting and the input signal port and generates the input signal whose voltage level depends on the connection state of the external terminal for setting; and
a level judgment section which judges, on the basis of the voltage level of the input signal input to the input signal port, whether the connection state of the external terminal for setting is the first connection state or the second connection state.

3. An in-vehicle sensor as claimed in claim 2, further comprising a potential generation section which generates a constant potential for judgment,
wherein the level generation circuit connects the external terminal for setting to the potential for judgment through a resistor, and generates the input signal through use of the potential of the external terminal for setting.

4. An in-vehicle sensor as claimed in claim 1, wherein the microprocessor has an output signal port from which an output signal is output, and
wherein the judgment section comprises:
an input generation circuit which is connected to the external terminal for setting, the input signal port, and the output signal port and which generates, as the input signal, a first input signal when the connection state of the external terminal for setting is the first connection state or a second input signal when the connection state of the external terminal for setting is the second connection state, at least one of the first and second input signals changing in response to a change in the output signal, and the first and second input signals being different from each other;
an output changing section which changes the output signal output from the output signal port; and
a response judgment section which judges whether the connection state of the external terminal for setting is the first connection state or the second connection state through use of a response of the input signal input to the input signal port to the change of the output signal.

5. An in-vehicle sensor as claimed in claim 4, wherein the input generation circuit is a circuit which connects the input signal port to the external terminal for setting and connects the input signal port to the output signal port through a resistor.

6. An in-vehicle sensor system comprising a plurality of in-vehicle sensors as claimed in claim 1 and the communication bus to which the in-vehicle sensors are connected,
the in-vehicle sensor system including a plurality of connection paths which connect the in-vehicle sensors to the communication bus and each of which includes a sensor connection connector provided for each of the plurality of in-vehicle sensors and mated with the bus connection connector of the corresponding in-vehicle sensor, wherein each of the plurality of connection paths includes a connection path for communication for connecting the one or plurality of communication external terminals of the bus connection connector to the communication line of the communication bus, and one or a plurality of setting paths each of which prevents the external terminal for setting from being connected to any potential or connects the external terminal for setting to the ground potential to thereby set the connection state of the external terminal for setting to the first connection state or the second connection state, wherein the one or plurality of setting paths differ among the connection paths in terms of the connection states of the external terminals for setting set by the setting paths or a combination thereof, whereby the identifiers of all the in-vehicle sensors are made different from one another.

* * * * *